(12) United States Patent
Dean et al.

(10) Patent No.: US 7,387,843 B2
(45) Date of Patent: *Jun. 17, 2008

(54) ALKYD-BASED FREE RADICAL WOOD COATING COMPOSITIONS

(75) Inventors: Roy E. Dean, Lower Burrell, PA (US); David A. Diehl, Pittsburgh, PA (US); Truman F. Wilt, Allison Park, PA (US); Ronald R. Ambrose, Pittsburgh, PA (US); Michael J. Ziegler, Pittsburgh, PA (US); William H. Retsch, Jr., Castle Shannon, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/252,380

(22) Filed: Oct. 18, 2005

(65) Prior Publication Data
US 2006/0035099 A1 Feb. 16, 2006

Related U.S. Application Data

(63) Continuation of application No. 10/196,804, filed on Jul. 17, 2002, now Pat. No. 7,001,667.

(51) Int. Cl.
*B32B 21/04* (2006.01)
*B32B 21/08* (2006.01)
*B32B 27/26* (2006.01)
*B32B 27/36* (2006.01)
*B32B 27/30* (2006.01)

(52) U.S. Cl. .................... 428/481; 428/480; 428/482; 428/514; 428/522; 528/295.5; 528/272; 528/302; 528/303; 528/306; 525/7; 427/372.2; 427/384; 427/385.5; 427/388.5; 427/389.9; 427/392; 427/393

(58) Field of Classification Search ............. None
See application file for complete search history.

(56) References Cited

U.S. PATENT DOCUMENTS

| | | | | |
|---|---|---|---|---|
| 2,537,949 A * | 1/1951 | Adams | .......................... | 525/7 |
| 2,890,185 A * | 6/1959 | Sample et al. | .................. | 525/7 |
| 2,949,383 A * | 8/1960 | Blake | .......................... | 428/414 |
| 2,988,524 A * | 6/1961 | Fitch | ............................ | 524/40 |
| 3,287,293 A * | 11/1966 | Dalibor | ........................ | 525/7 |
| 3,350,335 A * | 10/1967 | Silver | ........................... | 525/7.1 |
| 3,374,194 A * | 3/1968 | Wholf | ......................... | 525/7.3 |
| 3,446,764 A * | 5/1969 | Phillips et al. | ............... | 523/402 |
| 3,468,826 A * | 9/1969 | McWhorter et al. | ......... | 525/262 |
| 3,664,861 A | 5/1972 | Okamura et al. | ......... | 117/93.31 |
| 3,743,615 A * | 7/1973 | Yethon | ......................... | 525/7 |
| 3,748,293 A * | 7/1973 | Torelli | ........................ | 525/7.3 |
| 4,111,871 A * | 9/1978 | Aritomi | ....................... | 525/7.1 |
| 4,267,239 A | 5/1981 | Thankachan et al. | .... | 428/425.1 |
| 4,273,690 A * | 6/1981 | Walus | ............................ | 525/7 |
| 4,294,887 A * | 10/1981 | Nicks | ........................ | 428/423.1 |
| 4,511,692 A * | 4/1985 | Anderson et al. | .............. | 525/7 |
| 4,587,276 A * | 5/1986 | Lien et al. | ..................... | 522/34 |
| 4,591,518 A | 5/1986 | Schillinger et al. | ....... | 427/385.5 |
| 4,609,706 A | 9/1986 | Bode et al. | .................. | 525/7.4 |
| 4,894,317 A | 1/1990 | Mauyama et al. | .......... | 430/319 |
| 4,914,139 A * | 4/1990 | Ruhoff et al. | ............... | 523/500 |
| 4,981,887 A * | 1/1991 | Ruhoff et al. | ............... | 523/501 |
| 5,039,740 A * | 8/1991 | Anderson et al. | ............ | 525/7.1 |
| 5,744,248 A | 4/1998 | Meixner et al. | ............ | 428/482 |
| 5,821,324 A | 10/1998 | Jones | ....................... | 528/295.5 |
| 5,928,778 A * | 7/1999 | Takahashi et al. | .......... | 428/323 |
| 5,942,556 A | 8/1999 | Friedlander et al. | .......... | 522/76 |
| 6,017,640 A | 1/2000 | Muthiah et al. | ............. | 428/514 |
| 6,184,264 B1 * | 2/2001 | Webster | ...................... | 522/182 |
| 6,548,565 B1 * | 4/2003 | Van Den Berg et al. | ....... | 522/17 |
| 6,627,700 B1 * | 9/2003 | Kadambande et al. | ........ | 525/7.3 |
| 6,794,055 B2 * | 9/2004 | Dean et al. | .............. | 428/537.1 |
| 2004/0013895 A1 * | 1/2004 | Dean et al. | .................. | 428/515 |

FOREIGN PATENT DOCUMENTS

| | | |
|---|---|---|
| CN | 1136579 | 11/1996 |
| EP | 0 002 866 | 7/1981 |
| JP | 53031911 | 9/1978 |
| JP | 53115311 | 10/1978 |
| JP | 62020566 | 1/1987 |
| JP | 63246890 | 10/1988 |
| JP | 01028381 | 1/1989 |
| JP | 02129213 | 5/1990 |
| JP | 04041563 | 2/1992 |
| JP | 04041564 | 2/1992 |
| JP | 04187427 | 7/1992 |

(Continued)

*Primary Examiner*—Vivian Chen
(74) *Attorney, Agent, or Firm*—Diane R. Meyers; Donald R. Palladino

(57) ABSTRACT

Coating compositions comprising a polymer and an initiator are disclosed. The polymer comprises an alkyd portion and a free radical curable portion that is pendant from the alkyd portion; the alkyd portion includes one or more fatty acid moieties that can be derived from one or more drying, semi-drying or nondrying oils. When drying or semi-drying oils are used, the molecules of the present invention exhibit a dual cure, both oxidative and free radical. The compositions are particularly suitable for coating substrates comprising wood. Methods for using the present compositions are also disclosed.

18 Claims, No Drawings

FOREIGN PATENT DOCUMENTS

| | | |
|---|---|---|
| JP | 2001002969 | 1/2001 |
| WO | WO 98/14500 | 4/1998 |
| WO | WO 98/56846 | 12/1998 |
| WO | WO 99/47617 | 9/1999 |
| WO | WO 01/27181 | 4/2001 |
| WO | WO 01/40336 | 6/2001 |

* cited by examiner

ALKYD-BASED FREE RADICAL WOOD COATING COMPOSITIONS

CROSS-REFERENCE TO RELATED APPLICATION

This application is a continuation of U.S. patent application Ser. No. 10/196,804, filed Jul. 17, 2002, now U.S. Pat. No. 7,001,667 which is incorporated herein by reference.

FIELD OF THE INVENTION

The present invention is directed to coating compositions suitable for application to wood substrates. More specifically, the invention relates to alkyd-based coating compositions that can be cured by free radical curing.

BACKGROUND OF THE INVENTION

There are a number of considerations relevant to coatings for wood substrates, such as cabinets, furniture, and the like. For example, the coating compositions should be curable without the need to apply excessive heat; wood substrates cannot be subjected to the high temperatures that can be used to cure coatings, for example, on metal substrates. In addition, it is desirable that the coatings offer sufficient resistance to mar and scratch, while at the same time having an aesthetically pleasing appearance. Finally, as with most coatings, environmental considerations are also relevant. Thus, improved coatings taking into account all of these considerations are desired.

SUMMARY OF THE INVENTION

The present invention is directed to coating compositions comprising a polymer in conjunction with an initiator. The polymer comprises an alkyd portion or moiety and a free radical curable portion or moiety. An alkyd, as is known in the art, is the reaction product of a polybasic acid and a polyhydric alcohol in the presence of an oil or fatty acid. Thus, the alkyd portion of the polymer comprises a fatty acid moiety. An appropriate initiator, such as a free radical initiator or cationic initiator, is selected based upon the type of free radical moiety used.

It will be understood that the present compositions can be cured by free radical cure and, in some embodiments, cationic cure. When the fatty acid moiety of the alkyd is derived primarily from a drying or semi-drying oil, the present compositions are also capable of oxidative cure, that is, cure at ambient temperature upon exposure to air. Significantly, the dual curing mechanism of certain embodiments of the present compositions does not interfere with the properties obtained from the cured coatings; indeed, the dual curing mechanism of certain embodiments may improve the properties obtained from the cured coatings.

DETAILED DESCRIPTION OF THE INVENTION

The present invention is directed to a composition comprising a polymer and an initiator. The polymer further comprises an alkyd portion and a free radical curable portion. The present polymer resins are more specifically described as ungelled alkyd resins containing pendant polymerizable groups. Typically, these groups will contain ethylenic unsaturation, and are therefore suitable for free radical cure. The initiator is selected based on the type of free radical curable moiety or moieties that are incorporated onto the polymer; in all cases, a free radical cure initiator can be used to cure the free radical moieties and in some embodiments a cationic cure initiator may be alternatively used. The composition is typically used in liquid form, and therefore also includes an appropriate solvent.

The alkyd portion of the present polymers can be prepared by first heating a polybasic acid or anhydride and a polyfunctional alcohol with a polyol alcoholysis reaction product. The polyol alcoholysis reaction product can be an oil, or an oil derivative, modified by ester interchange with a polyfunctional alcohol in order to form esters having an average hydroxyl functionality of two. The polyol alcoholysis reaction product contains hydroxyl groups. It will be understood that a small percent of the various reaction products may include some constituents of the polyol reaction product that do not contain hydroxyl groups, but the majority of the reaction products will contain hydroxyl groups.

Suitable polybasic acids/anhydrides that can be used in forming the alkyds used in the present polymers include polycarboxylic acids and anhydrides thereof. Examples of polycarboxylic acids include phthalic acid, isophthalic acid, terephthalic acid, tetrahydrophthalic acid, hexahydrophthalic acid, adipic acid, azelaic acid, glutaric acid, 3,3-diethylglutaric acid, malonic acid, pimelic acid, sebacic acid, suberic acid, succinic acid, 2,2-dimethylsuccinic acid, 2-methylsuccinic acid, dodecenylsuccinic acid, itaconic acid, fumaric acid, maleic acid, citraconic acid, diethyl maleic acid, and trimellitic acid; the anhydrides of those polybasic acids are also suitable. Phthalic anhydride together with small amounts of hexahydrophthalic anhydride are particularly suitable. Polybasic acids having greater than three acid moieties or the higher polyfunctional alcohols should not be utilized in amounts that will cause the alkyd resin to gel during preparation.

The oil used in the polyol alcoholysis reaction product can be selected from one or more drying oils, one or more semi-drying oils, one or more non-drying oils, and mixtures thereof. When one or more drying oils, one or more semi-drying oils or mixtures of drying and semi-drying oils are used, the present compositions will be capable of undergoing oxidative cure. Similarly, if a mixture of at least one of the drying oils or the semi-drying oils with a non-drying oil is used, with the mixture being predominantly drying and/or semi-drying, the compositions will also undergo oxidative cure. "Predominantly drying" and/or "semi-drying" means that at least about 45 percent of the oils used are drying and/or semi-drying. Both drying and semi-drying oils contain carbon-carbon double bonds that are capable of undergoing oxidative crosslinking, whereas nondrying oils either don't contain such bonds or don't contain a sufficient number of such bonds to effect cure. Examples of drying and semi-drying oils include castor oil, dehydrated castor oil, cottonseed oil, fish oil, linseed oil, menhaden oil, oiticica oil, palm kernel oil, perilla oil, safflower oil, sardine oil, soybean oil and tung oil. Linseed oil is an especially suitable drying oil, and soya an especially suitable semi-drying oil. Examples of non-drying oils include valeric acid, heptanoic acid, 2-ethyl hexanoic acid, pelargonic acid, isononanoic acid, lauric acid, coconut oil fatty acid, stearic acid and branched fatty acids containing 18 carbon atoms. Coconut oil is particularly suitable. In one embodiment of the invention, tall oil is specifically excluded.

Suitable polyfunctional alcohols that can be used for both the reaction with the polybasic acid/anhydride and for use in preparation of the polyol alcoholysis product include polyhydric alcohols having 2 to 6 hydroxyl groups per molecule including dihydric alcohols such as ethylene glycol, 1,2-propylene glycol, 2,3-butylene glycol, 1,4-butanediol, 1,5-pentanediol and 2,2-bis(4-hydroxycyclohexyl) propane; trihydric alcohols such as glycerine, 1,1,1-trimethylolethane, 1,1,1-trimethylolpropane and 1,2,6-hexanetriol; tetrahydric alcohols such as erythritol, pentaerythritol and alpha-methyl glucoside; pentahydric and hexahydric alcohols such as tetramethylolcyclohexanol, dipentaerythritol, mannitol and sorbitol; polyallyl alcohol; and oxyalkylene adducts such as diethylene glycol, triethylene glycol and polyethylene glycol. 1,1,1-trimethylolpropane and pentaerythritol are particularly suitable; the alcohol used in the polybasic acid/anhydride reaction can be the same or different as the alcohol used in the alcoholysis reaction.

The alkyd portion can also be prepared by first reacting a free fatty acid with a polyfunctional alcohol to form esters having an average hydroxyl functionality of two. These esters are then admixed with the polybasic acid and the polyfunctional alcohol and the mixture heated to form the alkyd portion of the present polymers. It is also possible to prepare the alkyd by incorporating the fatty acid and the polyfunctional alcohol with the polybasic acid and heating the mixture to reaction temperature.

Examples of free fatty acids include those derived from the oils listed above by known processes, such as fatty acids having 4 to 22 carbon atoms and characterized by a terminal carboxyl group, such as octanoic acid, decanoic acid, dodecanoic acid, hexadecanoic acid, octadecanoic acid, cis-9-octadecenoic acid, 12-hydroxy-cis-9-octadecenoic acid, cis-9, cis-12-octadecadienoic acid, cis-9, cis-12, cis-15-octadecatrienoic acid, cis-9, trans-11, trans-13-octadecatrienoic acid, 5,8,11,14-docosatetraenoic acid and cis-13-docosanoic acid.

An aromatic monobasic acid can optionally be used in any of the above methods. Suitable acids for use include monocarboxylic acids, especially aromatic monocarboxylic acids, such as benzoic acid, para-tertiarybutylbenzoic acid, toluic acid and chlorobenzoic acid.

Additional points of unsaturation can also be introduced into one or more alkyd moieties. Such unsaturation can be introduced, for example, in the form of "electron poor" compounds such as maleic acid or anhydride, fumaric acid, and itaconic acid. An "electron poor" compound is a compound containing at least one electron poor carbon-carbon double bond; an electron poor carbon-carbon double bond is one that is located in the molecule near one or more strong electron withdrawing groups, such as a carbonyl group. These unsaturated moieties can be introduced into the alkyd backbone by including compounds containing these moieties in the starting raw materials for the alkyd preparation. It will be appreciated that the unsaturation is maintained following incorporation of the compound into the backbone, such that additional points of unsaturation in the backbone are achieved. These types of electron poor molecules are appropriately used to react with certain electron rich ethylenic unsaturated molecules to free radically cure the system.

Useful hydroxyl-containing alkyd resins for use in the present polymers are those having an oil length of from about 15 percent to about 70 percent, such as from about 15 to 35 percent. Typically, the oil or fatty acid used in the alkyd has an iodine value of greater than 100. "Iodine value" refers to the amount of carbon-carbon double bonds and is measured by iodine titration.

The hydroxyl-containing alkyd resin is then reacted with one or more compounds that introduce the free-radical curing moiety onto the alkyd. Any means for attaching these moieties onto the alkyd backbone can be used. For example, compounds containing functionality that will react directly with the hydroxyl group of the alkyd can be used when such compounds also contain a free radical curing moiety. Examples of such compounds include isocyanate functional materials, (meth)acrylic acid, and (meth)acrylic esters with free radical curable moieties. One embodiment of the invention specifically excludes the addition of a free radical curable moiety by using the reaction product of a methacrylic acid ester having hydroxyl groups and an isocyanate compound having at least two isocyanate groups.

In a particularly suitable embodiment, an isocyanate-functional ethylenically unsaturated compound is reacted with the alkyd to form an ungelled urethane modified alkyd resin having pendant polymerizable groups. Embodiments having urethane linkages can give enhanced performance properties to the present compositions, particularly in the areas of toughness and adhesion. Suitable isocyanates are any known isocyanates that, when reacted with the hydroxyl containing alkyd resin, form an ungelled urethane modified alkyd resin having pendant polymerizable ethylenic unsaturation. For example, both urethane-free isocyanate-functional ethylenically unsaturated compounds and isocyanate-functional ethylenically unsaturated compounds having one or more urethane groups can be used.

Examples of urethane free isocyanate-functional compounds include isocyanatoalkyl (meth)acrylates such as isocyanatoethyl acrylate, isocyanatopropyl acrylate, isocyanatobutyl acrylate, isocyanatoethyl methacrylate, isocyanatopropyl methacrylate and isocyanatobutyl methacrylate; isocyanatoalkyl crotonates such as isocyanatobutyl crotonate; and isocyanate-functional monoalkenyl aromatic monomers such as alpha-methylstyrene-meta-isopropyl isocyanate and alpha-methylstyrene-para-isopropyl isocyanate. (Meth)acrylate and like terms thereof are used conventionally in the art and herein to refer to both acrylate and methacrylate.

Isocyanate-functional ethylenically unsaturated compounds having one or more urethane groups can be prepared by the reaction of isocyanates, particularly diisocyanates, with ethylenically unsaturated alcohols in appropriate molar amounts to provide a predominance of mono-isocyanate-functional ethylenically unsaturated compounds. Examples of ethylenically unsaturated alcohols include acrylic functional monohydric alcohols such as (meth)acrylates, particularly hydroxyethyl acrylate, hydroxypropyl acrylate, hydroxybutyl acrylate, hydroxyethyl methacrylate, hydroxypropyl methacrylate and hydroxybutyl methacrylate; hydroxyalkyl crotonates such as hydroxybutyl crotonate; and allyl ethers of polyhydric alcohols such as trimethylolpropane diallyl ether, ethylene glycol monoallyl ether and pentaerythritol triallyl ether. Other ethylenically unsaturated moieties can be derived from "electron rich" compounds, for example, vinyl ethers including but not limited to hydroxyalkylvinyl ethers, such as hydroxybutyl and hydroxypropylvinyl ethers; and styrene. "Electron rich" compounds are compounds with electron rich carbon-carbon double bonds; an electron rich carbon-carbon double bond is one that is directly adjacent to one or more electron-donating groups, such as oxygen atoms from ether or ester groups, and aromatic rings.

Suitable isocyanates include any known di- or polyisocyanates that, when reacted with the alcohol, form an isocyanate-functional ethylenically unsaturated compound having a predominance of monoisocyanate functionality; "predominance" means at least about 50 percent. Examples of isocyanates include polyisocyanates and diisocyanates known in the art such as diphenylmethane diisocyanate, 1,6-hexamethylene diisocyanate and 3,5-toluene diisocyanate. Particularly suitable di- and polyisocyanates have differing reactivity caused, for example, by stearic hindrance, and include, for example, 2,4-toluene diisocyanate; mixtures of toluene diisocyanates having a majority of the species having differing activity, such as 80 percent 2,4-toluene diisocyanate and 20 percent 2,6-toluene diisocyanate by weight are also particularly suitable as is isophorone diisocyanate. Other polyisocyanates suitable for use in the present invention include diisocyanates, such as 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethyl hexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5 (or 6)-bis(isocyanatemethyl)-bicyclo[2.2.1]heptane. Among these diisocyanates, 2,4-tolylene diisocyanate, isophorone diisocyanate, xylylene diisocyanate, and methylenebis(4-cyclohexylisocyanate) are particularly suitable. These diisocyanate compounds can be used either alone or in combination.

The preparation of the isocyanate-functional ethylenically unsaturated compounds having one or more urethane groups can be accomplished by any means known in the art. The temperature at which the reaction takes place depends upon the specific reactants. The reaction of toluene diisocyanate and hydroxyethyl (meth)acrylate, for example, generally takes place from 0° C. to 120° C., such as from 20° C. to 90° C., or at least about 25° C. The ratio of equivalents of alcohol to equivalents of isocyanate is typically between 0.8:2.0 and 1.2:2.0.

The alkyd resin and the isocyanate-functional ethylenically unsaturated compound are typically reacted together below 100° C. Above this temperature, in the absence of a suitable inhibitor, certain isocyanate-functional unsaturated compounds may polymerize with themselves or other unsaturation in the alkyd. The reaction is typically carried out at about 65° C., optionally in the presence of an inhibitor and optionally in the presence of a catalyst. The inhibitor, such as 2,6-ditertiarybutyl-p-cresol (commercially available from Shell Oil Co. as IONOL) may be added to retard or prevent addition polymerization. The catalyst is used to promote reaction speed. An example of the catalyst is dibutyltin dilaurate.

It will be appreciated based upon the reactions described above, that the polymers of the present invention comprise one or more alkyd portions and one or more free radical curing portions. Fatty acid moieties will be incorporated into the backbone of the alkyd portion, which will be a branched compound. Free radical curable moieties can be attached at the end of these branches. It will be understood, however, that not all branch ends will have a free radical curable moiety attached thereto, and in fact, there will most certainly be some branches to which a free radical curable moiety is not attached. In a particularly suitable embodiment, the pendant free radical curable moieties contain ethylenically unsaturated groups that are attached to the alkyd portion through urethane linkages. It will further be understood that certain of the free radical curable moieties, such as those derived from vinyl ether, could alternatively be cured by cationic cure. A moiety that can be cured by either cationic cure or free radical cure is referred to herein as the "free radical curable portion", the "free radical moiety" or like terms. Whether free radical cure or cationic cure is used with these moieties depends on the initiator used.

The amount of polymer in the present compositions will typically range from about 40 to 85 weight percent, such as about 60 to 75 weight percent, with weight percent being based on the total weight of the composition. The polymers of the present invention will typically have a hydroxy value of from about 0 to 40, such as 15 to 30, and an acid value of less than 5, such as less than 2. In addition, the Mw of the polymers will typically be from 3,000 to 10,000, such as 5,000 to 7,000, the Mn about 1,000 to 4,500, such as 2,000 to 3,500, and the Mw/Mn about 1.1 to 5, such as 2.0 to 4.0. "Mw" refers to the weight average molecular weight as determined by size exclusion chromatography relative to linear polystyrene standards; "Mn" is the number average molecular weight as determined by size exclusion chromatography relative to linear polystyrene standards.

As noted above, the present compositions further comprise an initiator. If free radical cure is the appropriate or desired cure mechanism, then a free radical initiator is used. Those skilled in the art will understand that free radical cure includes the steps of initiation, propagation, chain transfer and termination. Cure can be initiated by use of actinic light, electron beam or heat, depending on the application requirements; suitable initiators can be selected based upon the particular free radical cure desired and appropriate for the free radical curing moiety or moieties included in the polymer. When radiation cure is desired, the present compositions may comprise at least one photoinitiator. Conventional free radical photoinitiators can be used, including but not limited to benzophenones, acetophenone derivatives, such as alpha-hydroxyalkylphenylketones, benzoins such as benzoin alkyl ethers and benzyl ketals, monoacylphosphine oxides, and bisacylphosphine oxides. Free radical initiators are commercially available from, for example, Ciba Specialty Chemicals Corporation in their DURACURE and IRGACURE lines; IRGACURE 184, IRGACURE 651, and DURACURE 1173 are particularly suitable.

If cationic cure is desired, for those compounds having a free radical curable portion capable of undergoing cationic cure, a cationic cure initiator is used. Examples of cationic initiators are triaryl sulfonium salts and diaryliodonium salts having non-nucleophilic anions such as hexafluorophosphate, hexafluoroantimonate, tetrafluoroborate and hexafluoroarsenate.

When the present compositions will undergo both free radical cure and oxidative cure, a thermal polymerization initiator can also be added. Examples include peroxides such as benzoyl peroxide; azo compounds; t-butyl oxybenzoate; metal oxides such as manganese dioxide; and cobalt octate. It will be appreciated that these compounds initiate oxidative cure. Thermal initiators are commercially available, for example, from Atofina and DuPont.

The amount of free radical or cationic initiator in the present compositions will typically range from about 0.1 to 5.0 weight percent, such as about 0.4 and 1.5 weight percent, based on total weight of the composition. If a thermal initiator is used, it is also typically present in an amount from about 0.1 to 5.0 weight percent, such as 0.4 to 1.5 weight percent, based on total weight of the composition.

Certain embodiments of the present invention, more specifically those in which the free radical curable moieties have been derived from an "electron rich" compound, may also utilize, in addition to an initiator, an "electron poor," compound. Examples of suitable electron poor compounds include maleic acid, maleic anhydride, fumaric acid, and itaconic acid. It will be appreciated that crosslinking is achieved by reaction between the electron rich and electron poor moieties; the electron poor moiety can react with the electron rich moiety from one or more separate alkyd molecules. As discussed above, the electron poor compound can be incorporated directly into the alkyd backbone of the polymer, and/or an electron poor compound can be added separately to the composition.

The present compositions further comprise a solvent. Suitable solvents include alkyl acetates, acetone, ketones, mono- and polyalcohols, aromatic hydrocarbons and mixtures thereof. A solvent is typically present in an amount of about 60 to 80 weight percent, with weight percent being based on the total weight of the composition.

As noted above, when a drying or semi-drying oil predominates in the fatty acid moieties of the alkyd portion, the present polymers will undergo two kinds of cure, oxidative and free radical (or cationic in certain embodiments). Because both curing moieties are on the same molecule, the result is one crosslinked network, comprised of one molecule that crosslinks in two ways. This is distinct from many compositions taught in the art that comprise alkyd or other moieties in conjunction with reactive diluents. In those compositions, there are two separate crosslinked networks—one formed from reactive diluent, such as an acrylate network, and one formed from the alkyd network; thus, two separate networks coexist in the mixture. In these compositions, reactive diluents are intentionally introduced in quantities sufficient to produce a crosslinked network. Again, this is distinct from the present compositions, which form one crosslinked network. The present compositions do not require the use of reactive diluents. Although small amounts of reactive diluents may be generated as by-products of other reactions, they are not generally intentionally introduced. If any reactive diluent is intentionally added to the present compositions, it is not present in an amount to produce a dense crosslink network, but rather is added to give the composition an immediate surface hardness via a quick cure. Such reactive diluents may be present, for example, in amounts of less than about 5 weight percent, based upon the total weight of the composition.

Significantly, the present compositions, when cured, have the desirable appearance similar to that achieved when using a composition that only undergoes oxidative cure, such as with an alkyd that has only the drying/semi-drying fatty acid moieties. Often, when a UV or other free radical cure is employed, a plastic look rather than a natural wood look is achieved.

It has been discovered, therefore, that the present compositions, when a drying or semi-drying oil predominates as the fatty acid moiety, provide a single crosslinked network of molecules in which crosslinking occurs in two ways. These compositions, when cured, show numerous characteristics desirable for coatings, including solvent resistance, mar and scratch resistance, toughness, adhesion and appearance. These improvements are seen, for example, as compared with systems that are wholly oxidative curing, or wholly free radical curing. In addition, when a urethane linkage is introduced in the present alkyds, improved properties are also seen in the area of toughness and adhesion. These characteristics are particularly desirable when applied to wood substrates.

Coatings formed from the present compositions wherein a non-drying oil predominates the fatty acid moiety have less yellowing than other coatings formed from compositions containing drying or semi-drying oils.

In addition to the polymer, initiator(s), and if relevant, the electron poor compound, the present compositions can contain other optional ingredients including ultraviolet absorbers, pigments and inhibitors known in the art. In addition, various fillers, plasticizers, flow control agents, surfactants and other known formulating additives may be used. Also useful in the coating compositions of the invention is an aluminum or titanium chelating crosslinker such as ALUSEC 510 ethyl acetoacetato-di-2-ethoxy ethoxy aluminum manufactured by Manchem Ltd. or TYZOR TPT tetraisopropyl titanate manufactured by DuPont Corporation. An antiskin agent such as methyl ethyl ketoxime is often added to improve package stability. Flatting agents, such as SYLOID 221 from W. R. Grace and TS 100 from Degussa, can also be added, as can additives for slip and mar resistance, such as BYK 301 from Byk Chemie or DC 57 from Dow Chemical, and sag resistance additives such as cellulose acetate butyrate 551-0.2 from Eastman Chemicals.

In addition, various additives that aid in nickel resistance can also be included. "Nickel resistance" refers to the ability of the coating to withstand gouge with a nickel. For example, VAGH, a high molecular weight thermoplastic terpolymer, commercially available from Union Carbide Corporation, can be added, as can various rosin gum esters, commercially available from Akzo Nobel.

The present coating compositions are suitable for application to wood substrates. Various woods that can be coated with the present compositions include, for example, oak and maple. These types of woods are used in the preparation of, for example, kitchen cabinets, bath cabinets, tables, desks, dressers, and other furniture.

The coating compositions can be applied to the substrate by any means known in the art. For example, they can be applied by brushing, dipping, flowcoating, oil coating, conventional and electrostatic spraying. Spray techniques are most often used. Typically, dry film thickness for the present coatings can range from about 0.5 to 1.2 mils per layer. Multiple layers can be applied.

Following application of the present coatings, it is typically desired to initiate the free radical or cationic cure. This can be done, for example, by exposing the coated substrate to UV radiation.

The oxidative air cure will occur after the free radical or cationic cure. Oxidative cure can be accomplished by merely allowing the coated substrate to be exposed to ambient or elevated temperature conditions. For example, the ambient or elevated temperature conditions can be those generally considered to be "air dry" or "force dry" conditions. This occurs at temperatures ranging from about 13° C. to 250° C., such as 20° C. to 150° C., or 50° C. to 90° C. Oxidative cure in the absence of accelerating conditions can take place over the course of several days to several weeks.

The present invention is further directed to a method for coating a substrate comprising applying any of the coatings described above and initiating free radical or cationic cure. The method can further comprise the step of allowing oxidative cure to take place, which may or may not involve affirmative steps. That is, the oxidative cure can simply occur on its own, without additional action by the user.

In addition, use of the present compositions allows for increased speed in the coating process. Accordingly, the present invention is further directed to a method for reducing cycle time in coating and curing a wood substrate, comprising applying to the substrate any of the compositions described above. Cycle time is improved, for example, as compared with typical alkyd urea systems currently being used in the art to coat wood substrates.

In its broadest sense, the present invention is directed to a liquid coating composition comprising a polymer capable of both oxidative cure and free radical or cationic cure, and is not limited to the particular alkyd portion containing polymer described above.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Also, as used herein, the term "polymer" is meant to refer to oligomers and both homopolymers and copolymers. The prefix "poly" as used herein refers to two or more.

EXAMPLES

The following examples are intended to illustrate the invention, and should not be construed as limiting the invention in any way.

Example 1

Part 1

An acrylate functional drying oil alkyd polymer of the present invention was prepared by first preparing a functionalizing agent using the follow procedure. 2005.6 parts by weight of isophorone diisocyanate, 7.0 parts by weight dibutyltin dilaurate, 1.5 parts by weight phenothiazine, and 5.7 parts by weight 2,6-di-tert-butyl methyl phenol were dissolved in 1000.5 parts by weight methyl isobutyl ketone in a flask equipped with a mechanical stirrer, nitrogen inlet tube, thermometer and a condenser. 1055.6 parts by weight of 2-hydroxyethyl acrylate were then added to the flask in a drop-wise fashion over three hours. The reaction vessel was not externally heated, but did increase in temperature during the course of the reaction due to the exothermic nature of the alcohol/isocyanate reaction. The highest temperature reached during the reaction was 74° C.

Part 2

An alkyd resin solution was prepared by mixing the ingredients in the amounts (parts by weight) shown in Table 1. The ingredients were added to a reaction vessel comprising a flask equipped with a mechanical stirrer, nitrogen inlet tube, thermometer, steam jacket column, fractionating column, and a distillation head connected to a condenser and a receiver. The resultant mixture was heated to react in a nitrogen atmosphere. At 160° C., water generated by the esterification process began to be collected. With continuous removal of water, heating continued to 182° C. The reaction was allowed to continue until the alkyd resin had an acid value of 20.4 mg KOH/gram. At this point, 157.1 parts by weight of neodecanoic acid oxiranyl methyl ester obtained from Exxon as CARDURA E were added to the reaction solution and allowed to react at 150° C. for two hours.

TABLE 1

| Ingredients | Parts by Weight |
| --- | --- |
| Linseed fatty acid | 503.2 |
| Neopentyl glycol | 70.2 |
| Trimethylol propane | 262.8 |
| Pentaerythritol | 163.1 |
| Phthalic anhydride | 435.0 |

TABLE 1-continued

| Ingredients | Parts by Weight |
| --- | --- |
| Benzoic acid | 190.0 |
| Hexahydrophthalic anhydride | 61.1 |
| Butyl stannoic acid | 1.9 |
| Toluene | 67.2 |
| Diisobutyl ketone | 527.8 |

The resin solution was then cooled, and to it was added 1018.7 parts by weight of the functionalizing agent prepared as described in Part 1, and 559.1 parts by weight methyl isobutyl ketone. The resin/functionalizing agent solution was then heated at 100° C., and held at that temperature until infrared spectroscopy indicated that all of the isocyanate groups had been consumed.

The reaction product was then cooled, discharged and analyzed. The determined solids content was 68.3% (by weight), acid value was 0.6 mg KOH/gram, and hydroxy value was 14.2 mg KOH/gram. Analysis of the resin solution by GPC (using linear polystyrene standards) showed the polymer to have an $M_w$ value of 7114, $M_n$ value of 1585, and an $M_w/M_n$ value of 4.5.

Example 2

Part 1

An acrylate functional non-drying oil alkyd polymer of the present invention was prepared by first preparing an alkyd resin solution by mixing the ingredients in the amounts (parts by weight) shown in Table 2. The ingredients were added to a reaction vessel of the type described in Example 1, Part 2. The resultant mixture was heated to react in a nitrogen atmosphere. At 160° C., water generated by the esterification process began to be collected. With continuous removal of water, heating continued to 190° C. The reaction was allowed to continue until the alkyd resin had an acid value of 17.9 mg KOH/gram. At this point 138.3 parts by weight of CARDURA E were added to the reaction solution and allowed to react at 150° C. for two and one-half hours.

TABLE 2

| Ingredients | Parts by Weight |
| --- | --- |
| Coconut fatty acid | 399.7 |
| Neopentyl glycol | 77.4 |
| Trimethylol propane | 290.1 |
| Pentaerythritol | 179.4 |
| Phthalic anhydride | 480.0 |
| Benzoic acid | 208.2 |
| Hexahydrophthalic anhydride | 69.0 |
| Butyl stannoic acid | 2.2 |
| Toluene | 44 |
| Diisobutyl ketone | 384.2 |

The resin solution was then cooled, and to it was added 1154.0 parts by weight of the functionalizing agent described in Example 1, Part 1 and 559.1 parts by weight methyl isobutyl ketone. The resin/functionalizing agent solution was then heated at 100° C., and held at that temperature until infrared spectroscopy indicated that all of the isocyanate groups had been consumed.

The reaction product was then cooled, discharged and analyzed. The determined solids content was 74.3% (by weight), acid value was 3.6 mg KOH/gram, and hydroxy value was 22.7 mg KOH/gram. Analysis of the resin solution by GPC (using linear polystyrene standards) showed the polymer to have an $M_w$ value of 3018, $M_n$ value of 1428, and an $M_w/M_n$ value of 2.1.

Example 3

Part 1

A vinyl ether functional drying oil alkyd polymer of the present invention was prepared by first preparing a functionalizing agent using the follow procedure. 1367.0 parts by weight of isophorone diisocyanate, 5.9 parts by weight dibutyltin dilaurate, 0.5 parts by weight phenothiazine, and 1.6 parts by weight 2,6-di-tert-butyl methyl phenol were dissolved in 685.0 parts by weight methyl isobutyl ketone in a reaction vessel of the type described in Example 1, Part 1. 712.0 parts by weight of 4-hydroxybutyl vinyl ether were then added to the flask in a drop-wise fashion over three hours. The reaction vessel was not externally heated, but did increase in temperature during the course of the reaction due to the exothermic nature of the alcohol/isocyanate reaction. The highest temperature reached during the reaction was 67° C.

Part 2

An alkyd resin of the type described in Example 1, Part 2 was prepared using the procedure described in Example 1, Part 2. Eight hundred parts by weight of the solution were added to a reaction vessel, in addition to 365.5 parts by weight of the functionalizing agent described in Example 3, Part 1, and 233.0 parts by weight methyl isobutyl ketone. The resin/functionalizing agent solution was then heated at 100° C., and held at that temperature until infrared spectroscopy indicated that all of the isocyanate groups had been consumed.

The reaction product was then cooled, discharged and analyzed. The determined solids content was 65.6% (by weight), acid value was 0.7 mg KOH/gram, and hydroxy value was 29.2 mg KOH/gram. Analysis of the resin solution by GPC (using linear polystyrene standards) showed the polymer to have an $M_w$ value of 5975, $M_n$ value of 1460, and an $M_w/M_n$ value of 4.1.

Example 4

A maleic anhydride functional drying oil alkyd polymer of the present invention was prepared as follows. First, an alkyd resin solution was prepared using the following procedure. Seven hundred fifty three parts by weight soya oil, 240.3 parts by weight diethylene glycol, and 1.5 parts by weight dibutyltin dilaurate were added to a reaction vessel of the type described in Example 1, Part 2. The mixture was heated to 224° C., and held at that temperature until a sample of the mixture was found to be soluble in ethanol. The reaction mixture was then cooled and to the flask was added 110.9 parts by weight diethylene glycol, 257.3 parts by weight maleic anhydride, and 1.3 parts by weight 2,6-di-tert-butyl methyl phenol. This mixture was then heated to 180° C., at which temperature water generated by the esterification process began to be collected. With continuous removal of water, the reaction was allowed to continue until the alkyd resin had an acid value of 6.3 mg KOH/gram. At this point 138.3 parts by weight of CARDURA E was added to the reaction solution and allowed to react at 150° C. for two and one-half hours. The resin was then partially cooled and dissolved in 404 parts by weight of xylene.

The reaction product was then further cooled, discharged and analyzed. The determined solids content was 76.5% (by weight), acid value was 3.0 mg KOH/gram, and hydroxy value was 53.2 mg KOH/gram. Analysis of the resin solution by GPC (using linear polystyrene standards) showed the polymer to have an $M_w$ value of 5940, $M_n$ value of 1320, and an $M_w/M_n$ value of 4.5.

Example 5

Coatings were prepared using the polymers prepared in Examples 1-4 and the compositions listed in Table 3. The ingredients were added to a paint can with agitation from a Cowles blade. After addition of all ingredients, mixing was continued for approximately 5 to 10 minutes to ensure homogeneity.

TABLE 3

| | Parts By Weight | | | |
|---|---|---|---|---|
| Ingredients | Sample 1 | Sample 2 | Sample 3 | Sample 4 |
| Resin from Example 1 | 44.8 | | | |
| Resin from Example 2 | | 50.0 | | |
| Resin from Example 3 | | | 42.8 | |
| Resin from Example 4 | | | 44.6 | 100.0 |
| RAPID-CURE DVE-3[a] | | | | 15.4 |
| VAGH Vinyl[b] | 6.5 | 6.3 | | |
| DARACURE 1173[c] | 0.6 | | | |
| IRGACURE 1800[d] | | 0.7 | | 1.5 |
| IRGACURE 184[e] | | | 3.0 | |
| 12% Cobalt CEM-ALL[f] | 0.2 | | 0.2 | 0.4 |
| 24% Zirconium HEX-CEM[g] | 0.3 | | 0.4 | 1.0 |
| 10% Calcium CEM-ALL[h] | 0.8 | | 0.8 | 1.7 |
| Modaflow[i] | | | 1.1 | |
| DC 57[j] | | 0.3 | | |
| OK 412[k] | | 2.1 | | |
| CAB 551.02[l] | | | 5.1 | |
| SYLOID 221[m] | | | 3.5 | |
| n-butyl acetate | 38.4 | 30.0 | 36.0 | 36.2 |
| Ethyl acetate | 15.0 | | | |
| Acetone | 12.2 | 10.5 | | |
| Methyl ethyl ketone | 12.2 | 10.5 | | |
| Butanol | | 5.0 | | 24.1 |
| Ethanol | | 10.2 | | |
| Isopropanol | | 4.2 | | |
| Diacetone alcohol | | | 36.0 | |
| Propylene glycol methyl ether acetate | | | 36.0 | |
| HI SOL 10[n] | 11.8 | 21.0 | | 24.1 |
| SOLVESSO 150[o] | 5.8 | | | |
| VM&P Naptha[p] | | | | 24.1 |
| Lactol Spirits 2300[q] | | | | 12.1 |

[a]triethylene glycol divinyl ether obtained from ISP Technologies, Inc.
[b]Vinyl chloride/vinyl acetate/vinyl alcohol terpolymer obtained from Union Carbide Corporation.
[c]2-hydroxy-2-methyl-1-phenyl-1-propanone obtained from Ciba Specialty Chemicals Corporation.
[d]Mixture of bis((2,6 Dimethoxybenzoyl) 2,4,4 trimethylpentyl) phosphine oxide and 1-hydroxycyclohexyl phenyl ketone obtained from Ciba Specialty Chemicals Corporation.
[e]1-hydroxycyclohexyl phenyl ketone obtained from Ciba Specialty Chemicals Corporation.
[f]Cobalt carboxylate obtained from OMG Americas, Inc.
[g]Zirconium carboxylate obtained from OMG Americas, Inc.
[h]Calcium carboxylate obtained from OMG Americas, Inc.
[i]2-ethylhexyl acrylate/ethyl acrylate copolymer obtained from Solutia, Inc.
[j]Silicone compound obtained from Dow Corning Corporation.
[k]Wax treated silica compound obtained from Degussa Corporation.
[l]Cellulose acetate butyrate compound obtained from Eastman Chemical Company.
[m]Micron sized silica gel obtained from W. R. Grace and Company.
[n]Aromatic hydrocarbon mixture obtained from Ashland Chemical, Inc.
[o]Aromatic hydrocarbon mixture obtained from Exxon.
[p]Heavy aromatic naptha solvent obtained from Exxon.
[q]Petroleum hydrocarbon fraction obtained from Citgo Petroleum Corporation.

Paints were applied to oak and maple veneers at a wet film thickness of 96 to 120 microns using a Devilbiss JGA-502 hand held spray gun equipped with a No. 30 cap and using 30 to 40 PSI of air to achieve the desired film thickness. Wet film thickness were verified using a Paul N. Garder Company Inc. wet film thickness gauge.

The coated veneers were given a five-minute ambient temperature flash, followed by a five-minute 160° F. bake. The veneers were then allowed to cool at ambient temperature for one minute, followed by exposure to 700 mj/cm$^2$ of UV exposure, then allowed to cool at ambient temperature for an additional four minutes.

The cured veneers were then sanded with 280 grit sand paper prior to application of a second coat of the formulation sample. The second coat was applied in the same manner as the first coat, with the exception of UV exposure, which was increased to 800 mj/cm$^2$ during the cure of the second coat.

After the application and UV curing of the second coat, the veneers were allowed to rest at either room temperature for one week or 120° F. for 24 hours to ensure crosslinking via oxidative drying oil cure for Samples 1, 3 and 4. All of the veneers were then tested for nickel scrape resistance, cross hatch, and stain resistance. The results of these tests are shown below in Table 4.

TABLE 4

| Coating | Nickel Scrape[r] | Tape Adhesion[s] | Stain Resistance[t] |
|---|---|---|---|
| Sample 1 | 7.2 | 5B | Pass |
| Sample 2 | 5.5 | 4B | Pass |
| Sample 3 | 5.5 | 2B | Pass |
| Sample 4 | 5.0 | 4B | Pass |

[r]Nickel scrape adhesion is a qualitative evaluation of a coating system's resistance to gouge. Nickel scrape was tested using five replicates on a single sample and with results reported in comparison to a control coating system. The test was conducted using a U.S. Government 5 cent coin without obviously worn surfaces. The nickel was grasped between the thumb and forefinger and, using medium to firm pressure, the nickel edge was scraped over the coated surface. The pressure required to gouge the coated surface was assigned a whole number from 1 to 10 with 1 being minimal effort and 10 being maximum effort.
[s]Performed according to ASTM D-359, with performance rated on the following scale:
5B = 100% adhesion
4B = 99%-95% adhesion
3B = 85%-94% adhesion
2B = 65%-84% adhesion
1B = 35%-64% adhesion
0B = 0%-34% adhesion
[t]Performed according to KCMA ANSI A161.1 and rated either pass (no staining) or fail (staining).

As can be seen in Table 4, all of the coatings prepared according to the present invention were resistant to stain, and gave good nickel scrape resistance and tape adhesion. Sample 1 gave particularly good results.

Therefore, we claim:

1. A coating composition comprising:
   a) a polymer that can be cured by free radical initiation and comprising
      i) an alkyd portion and
      ii) a free radical curable portion comprising polymerizable ethylenically unsaturated groups derived from an electron rich compound;
   b) a free radical or cationic initiator; and
   c) 60 to 80 weight percent, based on the total weight of the composition, of a organic solvent.

2. The coating composition of claim 1, wherein the alkyd portion comprises a fatty acid moiety derived from one or more drying oils; semi-drying oils; nondrying oils; or mixtures thereof.

3. The coating composition of claim 2, wherein the fatty acid moiety is derived predominantly from drying oils, semi-drying oils, or mixtures thereof.

4. The coating composition of claim 3, wherein the drying oil is linseed oil.

5. The coating composition of claim 3, wherein the semi-drying oil is soya.

6. The coating composition of claim 3, wherein the composition further comprises a thermal polymerization initiator.

7. The coating composition of claim 2, wherein the fatty acid moiety is derived predominantly from nondrying oils.

8. The coating composition of claim 7, wherein the nondrying oil is coconut oil.

9. The coating composition of claim 2, wherein the fatty acid moiety is derived from an oil having an iodine value of 100 or greater.

10. The coating composition of claim 1, wherein the polymerizable ethylenically unsaturated groups are vinyl ether groups.

11. The coating composition of claim 1, further comprising an electron poor compound.

12. The coating composition of claim 1, wherein the polymer has a hydroxy value of 0 to 40 and an acid value of less than 5.

13. A wooden substrate coated with the composition of claim 1.

14. The coating composition of claim 1, further comprising one or more compounds that impart nickel scratch resistance to the compound.

15. The coating composition of claim 1, wherein component (a) is present in a weight percent of 40 to 80, with weight percent being based on the total weight of the composition.

16. The coating composition of claim 1, wherein component (b) is present in a weight percent of between about 0.4 to 1.0, with weight percent being based on the total weight of the components.

17. A method for coating a substrate comprising:
   a) applying the coating composition of claim 1 to the substrate; and
   b) initiating cure of the free radical curable portion.

18. A method for reducing cycle time in the coating of a substrate comprising wood, comprising applying to the substrate the coating composition of claim 1 and initiating cure of the free radical curable portion.

* * * * *